June 24, 1930.   G. KELLNER   1,766,078
ELECTRICALLY CONTROLLED BRAKING DEVICE FOR POWER VEHICLES
Filed May 11, 1928

Inventor:
Georg Kellner
by
Attorney

Patented June 24, 1930

1,766,078

UNITED STATES PATENT OFFICE

GEORG KELLNER, OF BERLIN-WILMERSDORF, GERMANY

ELECTRICALLY-CONTROLLED BRAKING DEVICE FOR POWER VEHICLES

Application filed May 11, 1928, Serial No. 276,885, and in Germany December 11, 1926.

This invention relates to an electrically controlled braking device for power vehicles of that kind in which skidding is designed to be prevented, when the brakes are too rapidly or strongly applied, by cutting off the braking power automatically in the case of such an occurrence. Braking devices of that type are generally provided not only with an electric cut-out or switch actuated by the brake lever, but also with a second cut-out or switch which depends upon the speed of the motor-car and interrupts the circuit when the rotatory velocity of the wheels surpasses a certain limit, and which closes the circuit again when the speed of the car has so much diminished as to be again below that limit.

Concerning electric railway cars provided with regenerative motors, it is known to operate the brake lever and said second cut-out or switch successively in order to brake the car automatically when the supply of current to the motor ceases from any reason or when the speed of the car exceeds a certain limit.

Now, a braking device of that kind which by reason of the arrangement and combination of its parts is suited only for electric railway cars is, according to this invention, so transformed that it is particularly suited for motor-cars, and we attain this object by providing, for the actuation of the second cut-out switch inserted into the brake power circuit, an electromagnet located in a separate circuit which is independent of the first-mentioned circuit and is supplied with current either from an exciting dynamo driven by the vehicle wheels, or from another source of current located in said separate circuit. In this latter case a centrifugal governor switch connected with the wheels is provided to control the flow of current to the magnet.

Figure 1:
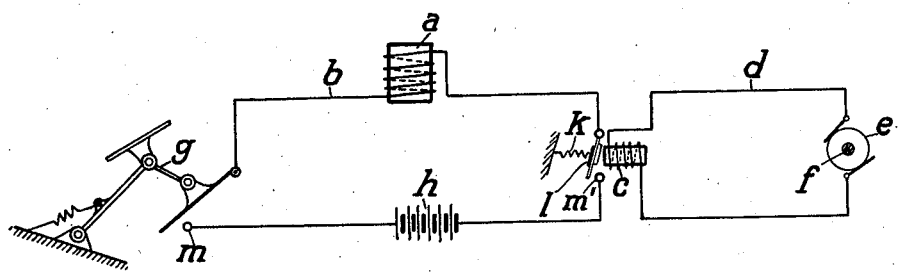
Figure 2:
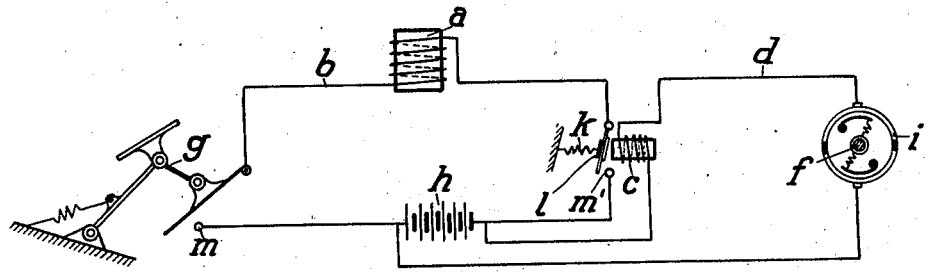
Figure 3:
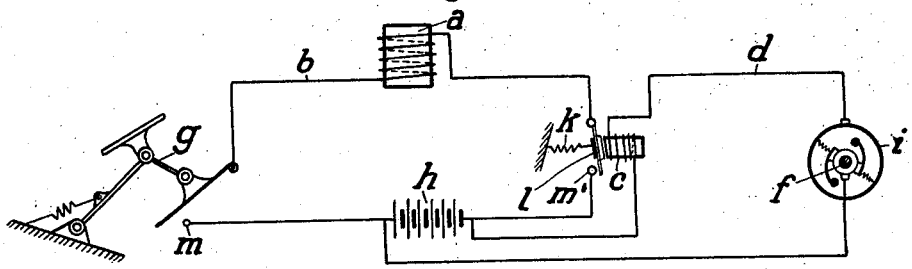

The invention is illustrated by way of examples on the accompanying drawing on which Figure 1 is a diagrammatic view of one constructional form of an electrically controlled braking device designed according to this invention, Figure 2 is a similar view showing another constructional form or modification, and Figure 3 is a similar view showing still another constructional form or modification.

Referring to Fig. 1, $a$ denotes the electromagnetic brake, $b$ a circuit into which it is inserted, $h$ a source of current, such as a battery, for this circuit, $m$ and $m'$ are two switches shown as held open by springs $k$ and $k'$ respectively. Switch $m$ is designed to be closed mechanically, for instance by the brake-pedal $g$, whereas the other switch $m^1$ is to be closed by an electromagnet $c$ inserted into a separate circuit $d$ in which is located also an exciting dynamo machine $e$ driven by an axle $f$ of the motor car.

Fig. 1 is diagrammatic and merely shows at $a$ an electro-magnet or solenoid, which when energized actuates the brake shoe (not shown). The switch $m'$ is illustrated as forming the armature of the electro-magnet $c$. The blade of switch $m$ is shown as operated by a pedal $g$ connected to the joint between two toggle links, these links being respectively pivoted to the blade of the switch and to the plow of the vehicle.

In Fig. 2 a centrifugal governor type of switch $i$ is substituted for the dynamo machine $e$ of Fig. 1, and the current for exciting the electromagnet $c$ is drawn from the battery, $h$, the wiring being such as to make the battery $h$ a part of the circuit $d$, as shown. Otherwise than this the construction shown in Fig. 2 is the same as in Fig. 1.

When the car is running at or above a certain predetermined speed, the circuit $d$ is closed, the electromagnet $c$, therefore, excited, and its armature keeps the switch $m^1$ closed so that, in order to close the circuit $b$ and to excite the electromagnet $a$ by the battery $h$, only the pedal $g$ need be depressed whereby the switch $m$ will be closed and the brake rendered active. When the speed of the car has decreased to a point below such predetermined speed, the dynamo machine will not supply sufficient current to energize the magnet $c$ and keep the switch $m'$ closed against the opening action of its spring, in consequence whereof the circuit $b$ will be opened and the brake $a$, therefore, rendered inactive.

The same is true of the modification shown in Fig. 2, in which as long as the car is running at or above the certain predetermined speed the circuit $d$ and switch $m$ are closed and the circuit $b$ is in condition to be closed by the pedal $g$ and the switch $m'$ in order to actuate the brake by means of the electromagnet $a$, while any reduction of the speed of the car below the certain predetermined speed will cause the centrifugal governor switch $i$ to open the circuit $d$, thus de-energizing the electromagnet $c$ so that the switch $m'$ is opened by its spring, and the electromagnet $a$ is rendered inoperative to actuate the brake.

It is also possible to design the centrifugal control switch and the electromagnet $c$ and the switch $m^1$ in such a manner that the contacts of the centrifugal control switch close the circuit $d$ when the centrifugal switch is at rest, so that under such conditions the armature of the electromagnet $c$ is attracted. In this case the spring $k$ is designed and arranged to operate switch $m'$ to close the circuit when the circuit $d$ is opened.

I claim:

1. An electrically controlled braking device for power vehicles, comprising, in combination, an electric brake, a source of electric current for exciting its magnet, a common manually controllable circuit for said brake and said source, a circuit closer inserted into this circuit, another circuit-closer also inserted into said circuit and adapted to be actuated electromagnetically, electromagnetic means for actuating said other circuit closer, a separate circuit into which said electromagnetic means are inserted, and speed-operated means for closing said separate circuit.

2. An electrically controlled braking device for power vehicles, comprising, in combination, a brake, a circuit controlling said brake, a manually controllable circuit closer inserted into this circuit, another circuit-closer also inserted into said circuit and adapted to be actuated electromagnetically, electromagnetic means for actuating said other circuit closer, a separate circuit into which said electromagnetic means are inserted, and means in said separate circuit for controlling the electro-magnetic means.

3. An electrically controlled braking device for power vehicles, comprising, in combination, an electric brake, a source of electric current for exciting its magnet, a common circuit for said brake and said source, a manually controllable circuit closer inserted into this circuit, another circuit-closer also inserted into said circuit and adapted to be actuated electromagnetically, electromagnetic means for actuating said other circuit closer, a separate circuit into which said electromagnetic means, as well as said source of electric current, are inserted, and speed-operated means for closing said separate circuit.

4. An electrically controlled braking device for power vehicles, comprising, in combination, an electric brake a source of electric current for exciting its magnet, a common circuit for said brake and said source, a manually controllable circuit closer inserted into this circuit, another circuit-closer also inserted into said circuit and adapted to be actuated electromagnetically, electromagnetic means for actuating said other circuit closer, a separate circuit into which said electromagnetic means, as well as said source of current are inserted, and centrifugal means for closing said separate circuit.

In testimony whereof I have affixed my signature.

GEORG KELLNER.